US009320382B2

(12) United States Patent
Lo Faro et al.

(10) Patent No.: US 9,320,382 B2
(45) Date of Patent: Apr. 26, 2016

(54) CAPSULE BASED SYSTEM FOR PREPARING AND DISPENSING A BEVERAGE

(71) Applicant: La Vit Technology LLC, New York, NY (US)

(72) Inventors: Gian Matteo Lo Faro, Miami, FL (US); John R. Laverack, Southbury, CT (US); Yuanli Shentu, Watebury, CT (US); Kurt R. Weseman, Middletown, CT (US); George E. Riehm, New Fairfield, CT (US); Greg G. Weaver, Waterbury, CT (US)

(73) Assignee: La Vit Technology LLC, New York, NY (US)

(*) Notice: Subject to any disclaimer, the term of this patent is extended or adjusted under 35 U.S.C. 154(b) by 375 days.

(21) Appl. No.: 13/941,948

(22) Filed: Jul. 15, 2013

(65) Prior Publication Data

US 2015/0017288 A1    Jan. 15, 2015

(51) Int. Cl.
*A47J 31/40* (2006.01)
*A47J 31/52* (2006.01)
*B65D 85/804* (2006.01)

(52) U.S. Cl.
CPC ............... *A47J 31/407* (2013.01); *A47J 31/52* (2013.01); *B65D 85/8043* (2013.01)

(58) Field of Classification Search
CPC ....... A47J 31/41; A47J 31/401; A47J 31/407; A47J 31/52; A47J 31/44; A47J 31/441; A47J 31/4425; A47J 31/4492
USPC ............ 222/614–166, 630, 637, 83, 184, 325
See application file for complete search history.

(56) References Cited

U.S. PATENT DOCUMENTS

| 2,903,163 | A | * | 9/1959 | Newman | A47J 31/40 222/129.4 |
| 3,064,553 | A | * | 11/1962 | Simjian | A47J 31/401 99/289 R |
| 3,101,870 | A | | 8/1963 | Betner | 222/153.07 |
| 3,295,998 | A | | 1/1967 | Goros | 99/282 |
| 3,300,094 | A | * | 1/1967 | Rockola | A47J 31/40 141/93 |
| 3,743,520 | A | | 7/1973 | Croner | 426/87 |
| 4,091,930 | A | | 5/1978 | Buchner et al. | 229/200 |

(Continued)

FOREIGN PATENT DOCUMENTS

| EP | 1844805 A1 | 10/2007 |
| EP | 2345355 | 7/2011 |

(Continued)

OTHER PUBLICATIONS

PCT/US14/46450 International Search Rpt and Written Opinion, Nov. 20, 2014.

(Continued)

*Primary Examiner* — Patrick M Buechner
(74) *Attorney, Agent, or Firm* — Clifford H. Kraft (57) ABSTRACT

An apparatus and method for dispensing of a substance from a capsule . More specifically, (1) a capsule, (2) a beverage dispenser for receiving the capsule, and (3) mechanisms within the beverage dispenser that automatically open the capsule and rotate the capsule while mixing a beverage within the capsule to pour into a user beverage container or glass. The apparatus and method for cracking and peeling open the capsule provides a more hygienic approach to capsule-based beverage systems.

30 Claims, 10 Drawing Sheets

(56) References Cited

U.S. PATENT DOCUMENTS

| | | | |
|---|---|---|---|
| 4,164,964 A * | 8/1979 | Daniels | B65B 3/34 |
| | | | 141/329 |
| 4,437,499 A | 3/1984 | Devale | |
| 4,492,295 A | 1/1985 | DeWoolfson | |
| 4,863,036 A | 9/1989 | Heijenga | 229/123.1 |
| 5,156,329 A | 10/1992 | Farrell | 229/125.35 |
| 5,316,603 A | 5/1994 | Akazawa et al. | 156/69 |
| 5,393,032 A | 2/1995 | Cederroth | |
| 5,433,374 A | 7/1995 | Forbes, Jr. | 229/125.35 |
| 5,613,617 A | 3/1997 | Da Vitoria Lobo | 220/359.2 |
| 5,906,845 A | 5/1999 | Robertson | |
| 6,085,942 A | 7/2000 | Redmond | 222/107 |
| 6,145,705 A | 11/2000 | Wallace et al. | |
| 6,182,554 B1 | 2/2001 | Beaulieu et al. | |
| 6,490,966 B2 | 12/2002 | Mariller et al. | |
| 6,584,888 B2 | 7/2003 | Cortese | |
| 6,748,850 B1 | 6/2004 | Kraan | |
| 6,857,252 B2 | 2/2005 | Haberstroh et al. | |
| 6,886,690 B2 | 5/2005 | Petricca | 206/356 |
| 6,945,157 B2 | 9/2005 | Brown et al. | |
| 6,994,015 B2 | 2/2006 | Bruinsma et al. | |
| 7,032,507 B2 | 4/2006 | Cai | |
| 7,165,488 B2 | 1/2007 | Bragg et al. | |
| 7,216,582 B2 | 5/2007 | Yoakim et al. | |
| 7,320,274 B2 | 1/2008 | Castellani | |
| 7,347,138 B2 | 3/2008 | Bragg et al. | |
| 7,412,921 B2 | 8/2008 | Hu et al. | |
| 7,921,766 B2 | 4/2011 | Halliday et al. | |
| 7,926,414 B1 | 4/2011 | Wolcott et al. | |
| 8,291,812 B2 | 10/2012 | Rivera | |
| 8,443,718 B2 | 5/2013 | Denisart et al. | |
| 8,445,047 B2 | 5/2013 | Ozanne | |
| 8,490,541 B2 | 7/2013 | Drost | |
| 8,495,949 B2 | 7/2013 | Tinkler et al. | |
| 8,516,948 B2 | 8/2013 | Zimmerman et al. | |
| 8,573,114 B2 | 11/2013 | Huang et al. | |
| D698,239 S | 1/2014 | De Pra | |
| 8,621,982 B2 | 1/2014 | Nosler et al. | |
| D699,567 S | 2/2014 | De Pra | |
| 8,678,234 B2 | 3/2014 | Doleman et al. | |
| 8,722,124 B2 | 5/2014 | Ozanne | |
| 8,733,229 B2 | 5/2014 | Jarisch et al. | |
| 8,784,915 B2 | 7/2014 | Evers et al. | |
| 8,800,431 B2 | 8/2014 | Sullivan et al. | |
| D713,719 S | 9/2014 | De Pra | |
| 8,820,215 B2 | 9/2014 | Bonacci et al. | |
| 8,820,216 B2 | 9/2014 | Vaugniaux et al. | |
| 8,833,238 B2 | 9/2014 | Hansen et al. | |
| 8,857,663 B2 | 10/2014 | Scholvinck et al. | |
| 8,875,617 B2 | 11/2014 | Favre | |
| 8,974,846 B2 | 3/2015 | Burton-Wilcock et al. | |
| 8,978,544 B2 | 3/2015 | Leuzinger et al. | |
| D726,534 S | 4/2015 | Lo Faro | |
| 9,027,463 B2 | 5/2015 | Sullivan et al. | |
| 2002/0048621 A1 * | 4/2002 | Boyd | A47J 31/3623 |
| | | | 426/77 |
| 2006/0000851 A1 * | 1/2006 | Girard | A47J 31/407 |
| | | | 222/129.1 |
| 2006/0034987 A1 * | 2/2006 | Thakur | A23F 5/405 |
| | | | 426/477 |
| 2007/0131687 A1 | 6/2007 | Otto et al. | 220/212 |
| 2007/0164045 A1 | 7/2007 | Wydler et al. | 222/106 |
| 2007/0175334 A1 | 8/2007 | Halliday et al. | |
| 2008/0148948 A1 | 6/2008 | Evers et al. | 99/275 |
| 2008/0190937 A1 | 8/2008 | Cho | 220/573.1 |
| 2008/0223741 A1 | 9/2008 | Nyambi et al. | |
| 2009/0194105 A1 | 8/2009 | Besseler et al. | |
| 2009/0241782 A1 | 10/2009 | Van Dillen et al. | 99/279 |
| 2010/0154644 A1 * | 6/2010 | Skalski | A47J 31/0668 |
| | | | 99/275 |
| 2010/0154649 A1 | 6/2010 | Skalski et al. | |
| 2010/0180775 A1 | 7/2010 | Kollep et al. | |
| 2010/0239728 A1 | 9/2010 | De Graaff | |
| 2011/0017071 A1 | 1/2011 | Stefanoni | |
| 2011/0126717 A1 * | 6/2011 | Gavillet | A47J 31/3623 |
| | | | 99/288 |
| 2012/0171334 A1 | 7/2012 | Yoakim et al. | |
| 2012/0231126 A1 * | 9/2012 | Lo Faro | A47J 31/407 |
| | | | 426/115 |
| 2012/0328740 A1 | 12/2012 | Nocera | |
| 2013/0014648 A1 | 1/2013 | Rognon et al. | |
| 2013/0061764 A1 | 3/2013 | Rivera | |
| 2013/0230627 A1 | 9/2013 | Hansen et al. | |
| 2013/0236609 A1 | 9/2013 | Magniet | |
| 2013/0247771 A1 * | 9/2013 | Maisch | A47J 31/44 |
| | | | 99/283 |
| 2013/0312619 A1 | 11/2013 | Spiegel et al. | |
| 2014/0023765 A1 | 1/2014 | Ozanne et al. | |
| 2014/0023766 A1 | 1/2014 | Ozanne et al. | |
| 2014/0083873 A1 | 3/2014 | Capitani et al. | |
| 2014/0134299 A1 | 5/2014 | Guidorzi et al. | |
| 2014/0302204 A1 | 10/2014 | Evers et al. | |
| 2014/0314926 A1 | 10/2014 | Hanes et al. | |
| 2014/0338542 A1 | 11/2014 | Smith et al. | |
| 2014/0338543 A1 | 11/2014 | Smith et al. | |
| 2014/0342067 A1 | 11/2014 | Sullivan et al. | |
| 2014/0342069 A1 | 11/2014 | Tinkler et al. | |
| 2014/0352547 A1 | 12/2014 | Leuzinger et al. | |
| 2015/0013279 A1 | 1/2015 | Swerchesky | |
| 2015/0040768 A1 | 2/2015 | Leuzinger et al. | |
| 2015/0041493 A1 | 2/2015 | Scholvinck et al. | |
| 2015/0047509 A1 | 2/2015 | Trombetta et al. | |
| 2015/0079240 A1 * | 3/2015 | Lo Foro | A47J 31/401 |
| | | | 426/115 |
| 2015/0144000 A1 | 5/2015 | Burton-wilcock et al. | |
| 2015/0150294 A1 | 6/2015 | Sinnema et al. | |
| 2015/0201789 A1 | 7/2015 | Smith et al. | |
| 2015/0223631 A1 | 8/2015 | Bentley et al. | |
| 2015/0238045 A1 | 8/2015 | Hansen et al. | |

FOREIGN PATENT DOCUMENTS

| | | |
|---|---|---|
| EP | 2415375 | 2/2012 |
| GB | 2380990 A | 4/2003 |
| WO | WO2004064585 | 1/2004 |
| WO | WO-2005/079637 A1 | 9/2005 |
| WO | WO2007016977 | 2/2007 |
| WO | WO-2010/025392 A2 | 3/2010 |
| WO | WO2011051867 | 5/2011 |
| WO | WO2013007487 | 6/2012 |
| WO | WO2013119495 | 2/2013 |
| WO | WO2013119534 | 2/2013 |
| WO | WO2013119543 | 2/2013 |
| WO | WO2014184653 | 5/2014 |
| WO | WO2014096082 | 6/2014 |
| WO | WO2014206814 | 6/2014 |
| WO | WO2015006443 | 1/2015 |
| WO | WO2015009580 | 1/2015 |
| WO | WO2015021557 | 2/2015 |
| WO | WO2015034496 | 3/2015 |
| WO | WO2015055849 | 4/2015 |
| WO | WO2015109062 | 7/2015 |
| WO | WO2014027235 | 11/2015 |

OTHER PUBLICATIONS

European Search Report corresponding to European Application No. 11840149.6, Aug. 23, 2013, 6 pages.

* cited by examiner

CAPSULE BASED SYSTEM FOR PREPARING AND DISPENSING A BEVERAGE

BACKGROUND OF THE INVENTION

1. Field of the Invention

This invention relates to systems for dispensing a beverage. The invention also relates to capsule used in a system for dispensing a beverage and methods of dispensing a beverage from a capsule.

2. Description of the Related Art

There are a number of devices and techniques for dispensing a beverage such as, for example, a cup of coffee or tea from a capsule. In one approach a disposable container fits on top of a cup and has a compartment for receiving a beverage extract such as coffee with a large reservoir on top into which a person must pour boiling water. These devices can be disposable but expensive, the coffee is exposed to the air where it can easily get stale or contaminated, and they are not generally suitable for automatic coffee making or other beverage machines. Because the flow rate of beverage is generally slow, these devices are typically large relative to the volume of beverage dispensed. Also, these devices can be designed to be used upright and only the bottom area is available for filtration flow and this contributes to the slowness of the filtration process. In one construction, a filter is provided in a sealed receptacle and a support member is included intermediate the receptacle and filter which functions to support the filter. When the filter is wetted, it sags and conforms with the support member which has a hole in it to release the filtered beverage but otherwise blocks the output of the filter. Such a filter design used in an application where water is injected under pressure would provide low flow rates.

There are several known companies operating proprietary capsule based machines in the coffee and tea space, including Nestlé's Nespresso and Special T, Green Mountain Coffee Roaster's Keurig, Starbucks Verismo, Kraft's Tassimo, Sara Lee's Senseo, Nescafe's Dolce Gusto, Illy, Lavazza's Blue and Britta Yource. Mars Flavia and Esio are machines utilizing a pouch-style single use dispensing system. Additionally, there are several known companies operating single serving drink machines in the commercial environment, including PHSI's Interpure, Waterlogic's Innowave, Vertex's Charm, Keurig, Nestlé and Mars Flavia.

Currently, there are other machines attempting to commercialize a similar capsule/pod based single-serve point of use cold beverage system. For example, Omnifrio, acquired by Primo Water, uses a puncture mechanism, which punctures the top and bottom of the capsule allowing a syrup concentrate to drain out. Bevyz uses a pressure mechanism to pop open the capsule to enable a mixing process. The Esio Hot & Cold Beverage System uses a syrup pouch system and pumps drink mix out of the pouch to mix it with water outside of the packet. Yource by Brita uses a capsule based machine.

When cold drinks are dispensed in a system in which the beverage is prepared by mixing cold fluid, usually water, with a powder instead of a liquid concentrate, one significant challenge is that the powder will not dissolve effectively during the mixing process. This can lead to poor quality output from the beverage system and unsightly and possibly unhealthful residue in the machine itself. Improved systems for providing a hot, cold, ambient temperature, carbonated, still mixed beverage designed to enable the effective mixture of the powder with the liquid during dispensing providing for little or no residue, contamination, or cross contamination between beverages are described in U.S. application Ser. No. 13/293,043, U.S. Provisional Application No. 61/411,786, and International Application No. PCT/US2011/060050, all of which are hereby incorporated by reference. The present disclosure describes an additional embodiment for providing mixed beverages.

BRIEF SUMMARY OF THE INVENTION

The purpose of the invention is to offer a compelling alternative to bottled water and other water based ready-to-drink (RTD) beverages. The invention is meant to offer a convenient, reliable, and cost effective Point of Use solution to the consumer's hydration and beverage needs. The invention is a single-serve beverage system that can produce unlimited chilled filtered water as well as single serve unique beverages through a proprietary capsule-based system. The invention can be cold, hot, still (i.e., not sparkling), carbonated, flavored, enhanced, ultra purified filtered waters and flavors.

The capsules contain a powder or a liquid, which is mixed into the filtered water to produce the beverage. The drinks can be "house formulas" or common mass market branded beverages licensed from the manufacturers.

The varied embodiments of the invention have multiple benefits:

On-Demand Pure Water: Unlimited filtered, pure water. Potentially unhealthy contaminants are filtered out of water.

On-Demand Custom Beverages: Users can enjoy many of their favorite branded beverages, produced with very pure water, chilled to the correct temperature. Option to make sparkling beverages available in certain machine models.

Reduction of $CO_2$: No need to transport heavy bottled beverage to point of consumption. Each machine in use lowers carbon emissions.

Reduction of Waste: No more plastic bottles that clog up landfills while still providing users with a good option for ready-to-drink (RTD) beverages.

Space Savings: No need to stock voluminous beverages saves space in the fridge/kitchen/pantry.

Health Benefit: Improved hydration resulting from more convenient and better hydration options including better concentration, better circulation, and overall general better health.

Financial Benefit: Capsules cost approximately 2-3% of the cost of regular bottled water and approximately 33% of the cost of some popular bottled beverages.

The cracking and peeling method of accessing the capsule offers an effective and efficient way to prepare and deliver a beverage. A mechanical device is adapted to crack the capsule along a crease punched into the capsule below the top cover of the capsule. The mechanical device peels open the capsule along the cracked crease. For example, a slight crease could be included in a lip of the capsule that can be used to break the seal and allow the cover to then be peeled back. Forces may be applied to the capsule to open the capsule at the creases to access the beverage. When the cover is peeled back (e.g., tearing open the capsule) the drink is mixed with a mixing stream of liquid, which in many embodiments will be water, either cold or hot, sparkling or still. Testing in a fully functional prototype has been successful in flushing a drink powder concentrate out of a capsule.

According to some embodiments, it is advantageous to promote a controlled tear in the crease of the capsule to ensure a smooth opening of the capsule. The controlled tear can serve to lower the force required to open the capsule and/or provide a more uniform and repeatable tear to open the capsule. A raised leading edge on the mechanism used to open the capsule can serve to provide a controlled tear. The raised leading edge can be located such that it would facilitate opening the capsule along a longitudinal center line of the capsule or it may be off the centerline of the capsule so that the peel will be initiated off the centerline and travel along a crease to open the capsule.

BRIEF DESCRIPTION OF THE DRAWINGS

These illustrations are illustrative of the present disclosure and should not be interpreted to limit the scope or range of the invention presented in this application.

DETAILED DESCRIPTION OF EMBODIMENTS OF THE INVENTION

The present disclosure relates to dispensing of a substance from a container by means of a dispensing apparatus. Specifically, the exemplary embodiments of the present invention relate to: (1) a capsule, (2) a dispenser for receiving the capsule, and (3) mechanisms within the dispenser to perform processes for opening the capsule and rotating the capsule while dispensing the mixed contents from the capsule into a user's beverage receptacle or glass. Each of these areas will be described in more detail below.

Figure 1:
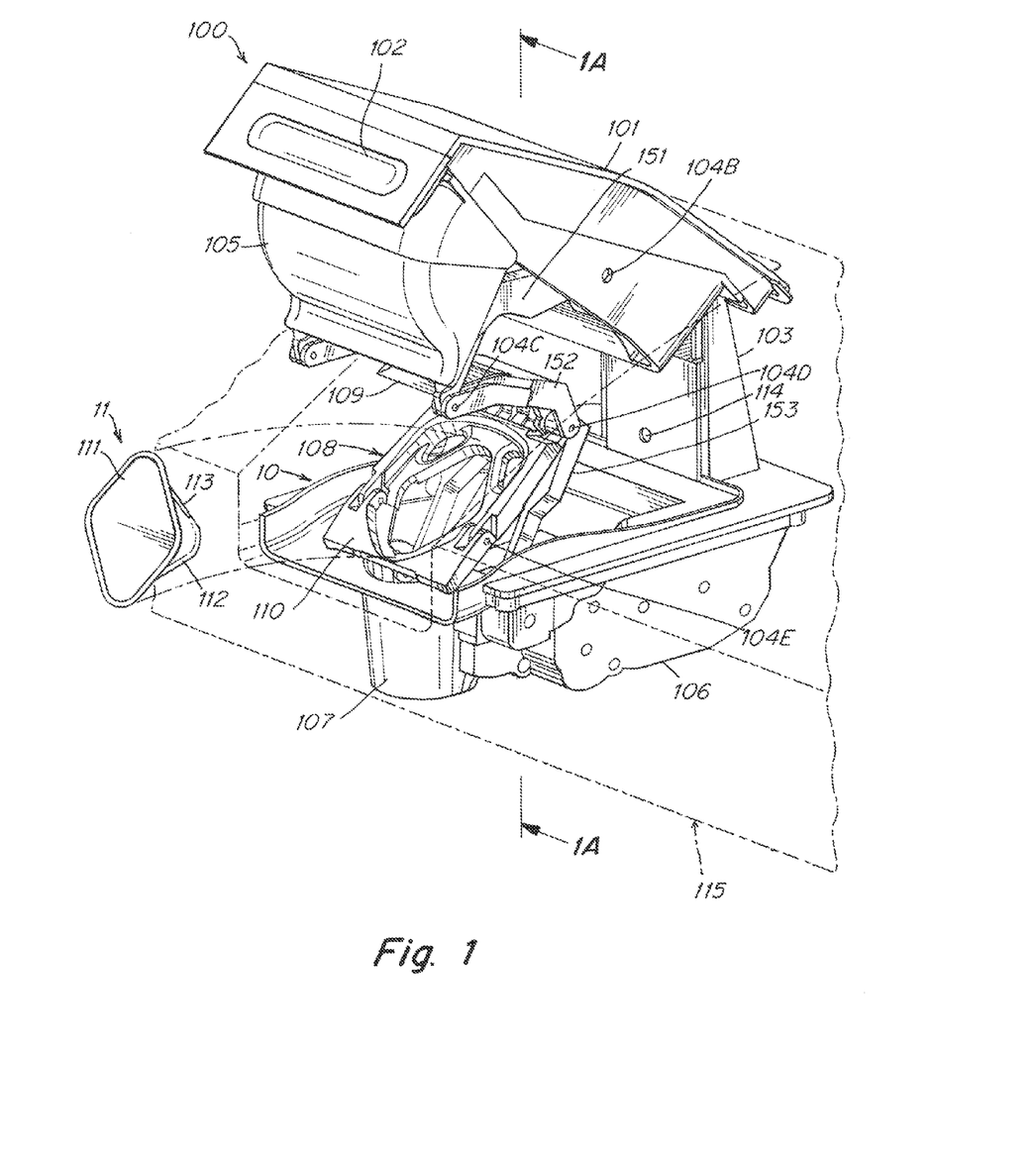
FIG. 1 is an isometric view of an exemplary embodiment of the present disclosure.

(1) the Capsule:

As shown in FIG. 1, the capsule 11 is comprised of several parts. The capsule 11 top 111 may be a cover that is bonded to a circumferential and planar rim of the capsule 11. The cover of capsule 11 top 111 may be a material such as aluminum foil, biodegradable material, plastics, or other recyclable material that may be affixed to the rim of the capsule 11 by a bonding agent, such as glue, or through a heat-sealing process. The cover of the capsule 11 top 111 seals the opening defined by the circumferential and planar rim of the capsule 11.

The capsule 11 includes a concave basin 112 extending below the capsule 11 top 111, with an opening defined by the circumferential and planar rim. The basin 112 forms a receptacle for holding one or more mixing agents, such as powders or liquids for mixing a beverage. For example, the basin 112 may be formed and filled with a mixing agent, after which the opening defined by the rim of the basin 112 may be sealed by affixing the cover of the capsule 11 top 111 to the rim.

When the capsule 11 is viewed from the top, the basin 112 may appear as a variety of shapes, such as axisymmetric shapes including a diamond or oval. The basin 112 may be formed according to a variety of sizes to accommodate a variety of quantities of mixing agents for a variety of sizes of mixed beverages. For example, the basin 112 may have a capacity or volume of approximately forty cubic centimeters (i.e., 40 cc). The volume of the basin 112 may be greater than the volume of the quantity of mixing agent sealed within the capsule 11 so as to leave room for portions of the beverage to be mixed within the capsule 11.

The basin 112 includes the planar circumferential rim to which the capsule 11 top 111 may be affixed. The rim may be wide enough to form a lip that is shaped to allow for a snug and secure fit of the capsule 11 within a dispenser 100 while the beverage is being mixed. The basin 112 may also have a crease or seam punched into the basin 112 below the capsule 11 top 111. The crease, which may be a pre-weakened portion of the capsule 11 under the rim, may be designed so that when the opening mechanism of the dispenser 100 applies forces to the capsule 11, the capsule 11 may be cracked and peeled open along the crease, forming an opening at an end of the capsule 11. The opening may be shaped to allow a fluid such as water to be injected into the capsule 11 for dissolving or mixing the mixing agent within the capsule 11. In addition, the opening may also be shaped to allow the mixed content to flow out of the capsule 11. In some embodiments, the capsule 11 may be designed for single use, and the capsule 11 may be removed, ejected, or otherwise discarded or recycled after making the beverage. In some embodiments, the capsule 11 may have additional pre-weakened portions, such that the capsule may be cracked and peeled at additional location to create more than one opening in the capsule. For example, openings may be formed in two ends of the capsule.

The volume of the capsule and the amount of mixing agent initially present in the capsule 11 may vary depending on the volume of the beverage. In some embodiments, the volume of the capsule 11 may be approximately 30 cc, and the capsule 11 may contain approximately 2-6.5 grams of mixing agent. In other embodiments, the capsule may contain approximately 15-20 grams of mixing agent.

The geometry of the opened capsule 11 may be optimized to maximize the mixing action and subsequent drainage of the mixed contents of the capsule 11 while directing the drainage to minimize any mess or cross-contamination between beverages caused by the mixed contents flowing out of the capsule 11. Additionally, the opening mechanism of the dispenser 100 may be designed to minimize the risk of contaminating the contents of the capsule 11 and the subsequent mixed beverage. For example, the opening mechanism may avoid introducing contaminants to the interior of the capsule 11, and the opened capsule 11 may permit fluid injection and mixture draining while avoiding contaminants on the exterior of the capsule 11 or the interior of the dispenser 100.

Another advantage of the present disclosure is that the exterior of the capsule 11 does not come into contact with the mixed beverage. There is no contact of finished product with the outside of the capsule 11, as there is no puncture of foil lid or capsule 11 base into the beverage, ensuring that the beverage maintains sterile. Most machines have contact of the outside of the capsule 11 and the finished beverage, which is not hygienic because the outside of the capsule 11 has been handled in a non-sterile fashion.

In some embodiments, the exterior of the capsule 11, such as an exterior side of the basin 112, may include optional encoded information 113, such as a barcode printed on the basin 112. The encoded information may identify aspects of the capsule 11 or its mixing agents to a sensor or scanner on the dispenser 100, such as a barcode reader, so that the dispenser 100 may adjust its beverage mixing processes accordingly. In other embodiments, the encoded information 113 may be encoded as a two-dimensional data matrix, such a Quick Response Code ("QR Code"). The scanner 114 on the dispenser 100 may be a camera capable of capturing the optical image of the encoded information for processing by one or more processors in communication with the camera.

Depending on whether the device is implemented in a business, in a home, or in another channel, the device may incorporate additional features, such as a locking feature. In some embodiments, the exterior of the capsule 11, such as an exterior side of the basin 112, may include optional printed graphics. For example, the capsule 11 may depict a trademarked image or logo. The scanner 114 (e.g., camera) of the dispenser 100 may be configured to capture the optical image of the graphic for processing by one or more processors in communication with the scanner 114. In conjunction with the processors and firmware, software, or another processor readable medium, the dispenser 100 may be in a locked state until a capsule 11 with an authentic and authorized graphic is inserted into the dispenser 100 in a correct orientation. After the graphic has been detected, the dispenser 100 may be in an unlocked state and proceed to mix a beverage with the contents of the inserted capsule 11.

In other embodiments, the encoded information may include information as to the optimal beverage parameters for a particular capsule. For example, if the coded information includes recipe information, the scanner 114 may be configured to capture the encoded recipe information for processing by one or more processors in communication with the scanner 114. In response to the processor(s) and firmware, software, or another processor readable medium, the various robotic actions of the dispenser 100, such as the volume of liquid in the pre-wetting stream, amount of total liquid dispensed by the mixing stream, and other parameters, may be adjusted to comply with the encoded recipe information.

A processor may be configured with a non-transitory processor readable medium comprising instructions that cause the processor to operate in accordance with embodiments of the present disclosure.

Figure 1A:
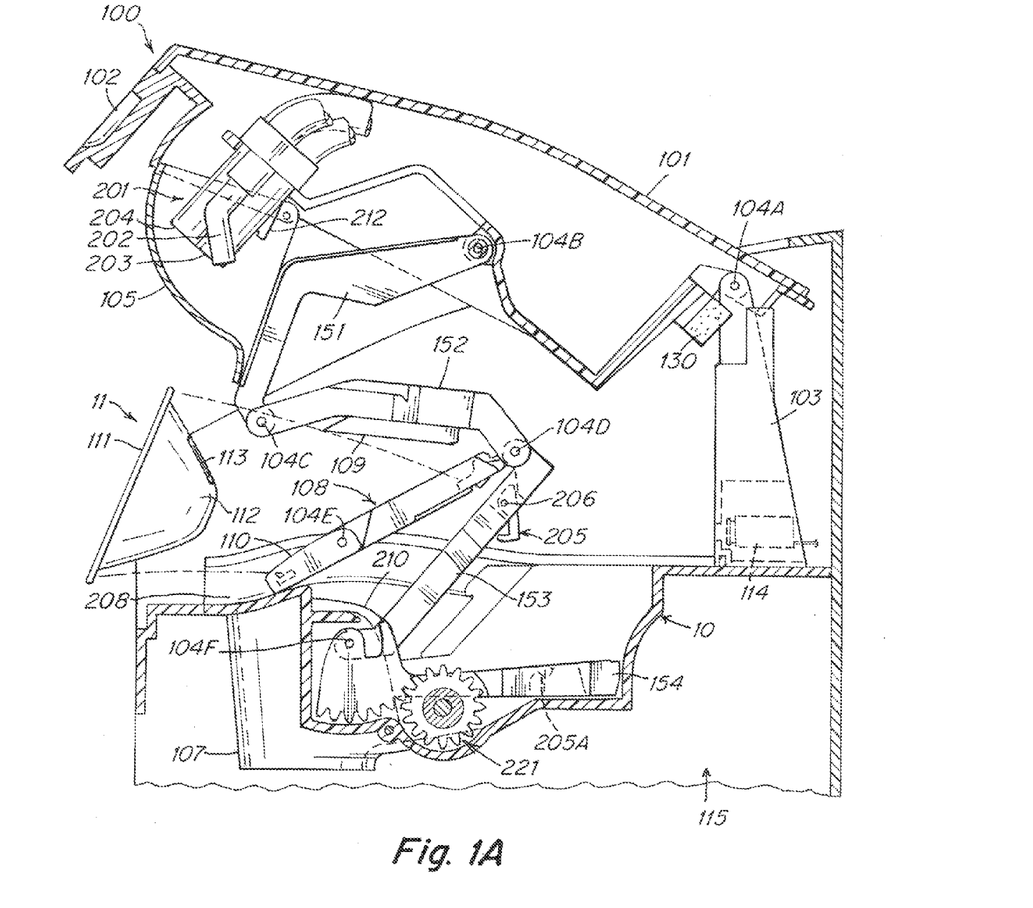
FIGS. 1A and 1B depict a cross section taken along section lines 1A-1A in FIG. 1.

(2) the Dispenser:

Another aspect of the disclosure is the dispenser 100 for receiving a capsule 11 and mixing a beverage using the capsule 11 and its contents. FIG. 1 is an isometric view of an exemplary beverage dispenser 100 of the present disclosure, and FIG. 1A is a cross section taken along section lines 1A-1A in FIG. 1. As illustrated, the dispenser 100 may comprise a frame 10 with a cover 101 that may be lifted and lowered by a handle 102, as well as rear housing 103 and base 115. The frame 10 defines a space for receiving a capsule 11 and provides points for attaching mechanisms used for mixing and dispensing a beverage. FIG. 1 depicts an exemplary embodiment of a dispenser 100. Other dimensions and configuration of various components within the frame 10 of the dispenser 100 may be used for mixing a beverage. In some embodiments, the dispenser 100 may be designed to sit on a countertop as a standalone appliance, whereas in other embodiments, the dispenser 100 may be adapted for installation within another appliance such as a refrigerator or water filtration system.

The dispenser 100 may be configured with additional interface elements not shown in FIG. 1, such as an optional display for displaying dispenser status information, advertisements, or other information that may be useful to a user. The dispenser 100 may provide touch-sensitive display or other buttons for selecting user-configured options for operating the dispenser 100.

Figure 2:
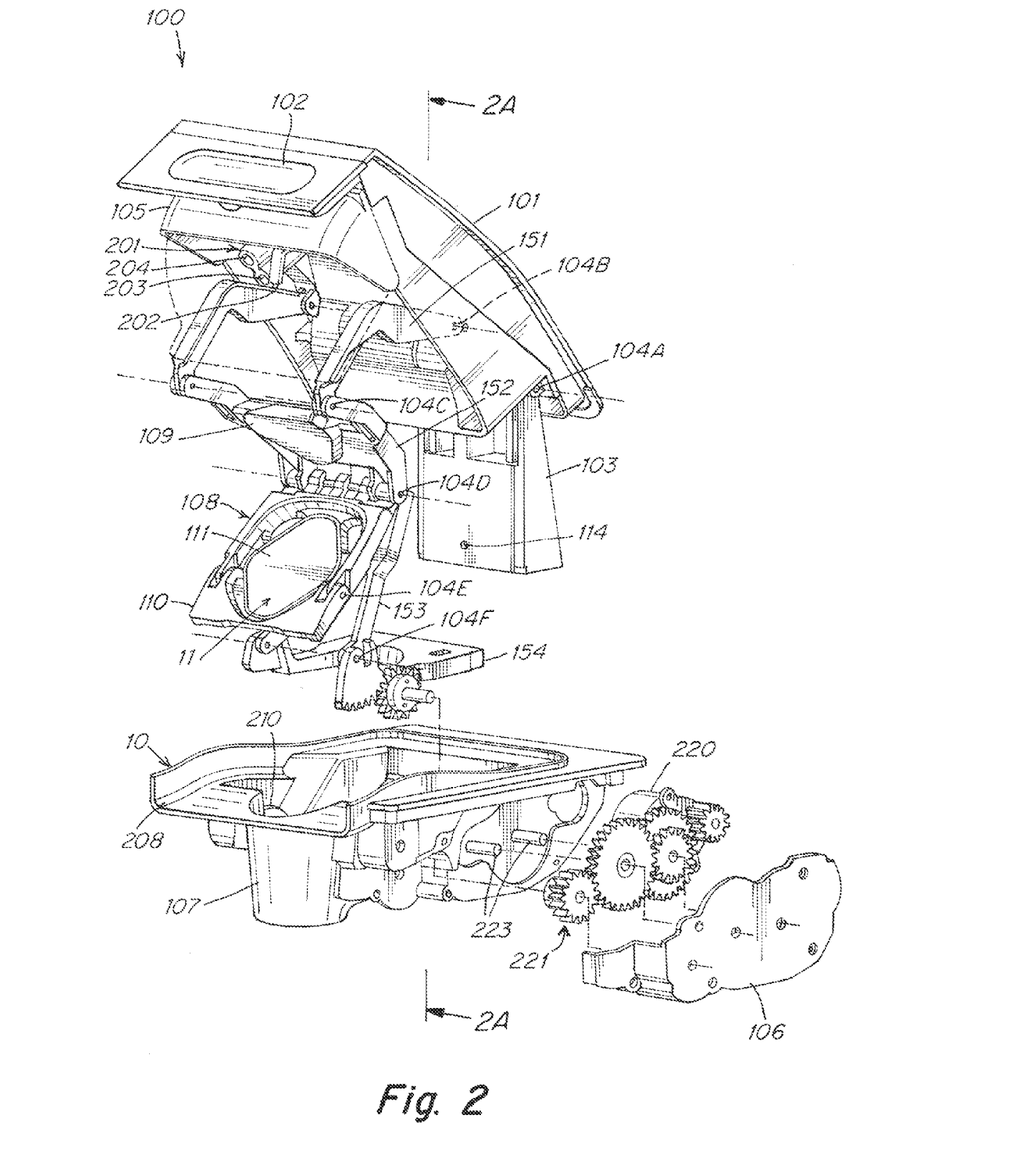
FIG. 2 shows an exploded isometric view in accordance with the embodiment depicted in FIG. 1.

The base 115 may contain a motor 220 and one or more gears in a gear train 221 or other mechanical devices for effecting movement of components within dispenser 100 (as shown in FIGS. 1A and 2), such as rotating the capsule 11 while the beverage is mixed. The capsule 11 itself may be placed within a receiving compartment 108, which may be attached to the frame 10 by hinges or other means that permit the receiving compartment 108 to move within the dispenser 100. When the cover 101 is pushed down and the dispenser 100 is in a closed position, the receiving compartment 108 may recede within the space defined by the frame 10 of the dispenser 100 to facilitate the opening of the capsule 11 and rotation of the capsule 11 while the beverage is mixed within the capsule 11 and drained from the capsule 11.

In some embodiments, a nozzle array 201 may be attached to the cover 101 as shown in FIG. 1A. A retractable shield 105 may also be attached to the cover 101 by a pivot. As the cover 101 is lifted up and the dispenser 101 is brought into an open position, the nozzle array 201 would be lifted up along with the cover. The retractable shield 105 would pivot down in front of the nozzle array 201 as shown in FIG. 1A to protect the nozzle array 201 from contamination and create a more aesthetically pleasing presentation to a user by concealing or obscuring components of the dispenser 100 that a user would not need to manipulate while inserting a capsule 11 into the open dispenser 100.

Additionally, the receiving compartment 108 may comprise a hinged portion 110 to facilitate opening the capsule 11. The receiving compartment 108 may be configured so that when the dispenser 100 is open, the hinged portion 110 is flat, lying in the plane with the rest of the receiving compartment 108, as shown in FIG. 1. When the dispenser is closed or being closed, the opening mechanism of the dispenser 100 may cause the hinged portion 110 to swing up, applying a torque or other pressure to the crease in the capsule 11 to crack the capsule 11 and tear open the capsule 11 along the crease. In some embodiments, and anvil 109 may be attached to the cover 101, so that when the cover 101 is lowered, the anvil will contact a portion of the capsule 11 top 111 to hold the capsule 11 in place as hinged portion 110 of the receiving compartment 108 pivots toward the capsule 11 top 111.

A shield 107 may attached to the frame 10 of the dispenser 100 in a position underneath the receiving compartment 108. The shield 107 may be cylindrical in shape and may be wide enough so that the mixed contents of the beverage flowing into a beverage container may not make contact with the inner walls of the shield 107. In this sense, the shield 107 remains clean and avoids contamination. The shield 107 may serve in part as a guide to the user to indicate where a cup or other beverage container should be positioned to receive the mixed contents of the beverage.

The rear housing 103, base 115, cover 101, or another portion of the dispenser 100 may comprise the scanner (e.g., camera, barcode reader, or other sensor) 114 or other sensor as shown in FIG. 1A, which may be exposed to encoded information (e.g., security image, two-dimensional data matrix, Universal Product Code barcode, or other encoding) on the capsule 11 through a hole in the rear housing 103 for the scanner 114 as shown in FIG. 1.

As shown in FIG. 1A, the frame 10 comprises several hinges to facilitate opening and closing of the dispenser 100 and movement of the components such as the receiving compartment 108 within the space defined by the frame 10. Specifically, hinge 104A may connect the cover 101 to the rear housing, enabling the cover 101 to pivot up to open the dispenser 100 and pivot down to close the dispenser 100. In some embodiments, a bumper 130 may be attached the cover 100 to provide a dampening effect when the cover 101 pivots down into a closed position. Alternatively, other dampening or cover latching mechanisms may be used instead of—or in addition to—the bumper 130.

As the cover 101 is lowered into a closed position, hinges 104B, 104C, 104D, 104E are configured to enable the components of the frame 10 to pivot and translate in a concerted folding arrangement to prepare the dispenser 100 and the capsule 11 for beverage mixing. Specifically, the arm 151 connecting hinges 104B and 104C may cause the retractable shield 105 to be pushed up, or retracted, within the cover 101, making space for the dispenser 100 to fully close, at which point the retractable shield 105 is not needed to protect the nozzle array 201 and other internal components.

The arm 152 of the frame 10 connecting hinges 104C and 104D provides the fixture for the anvil 109, and the arm 152 is shaped to position the anvil over the capsule 11 in the receiving compartment 108 when the cover 101 is lowered to a closed position.

The receiving compartment 108 is connected to the frame 10 at hinge 104D, and hinge 104E enables the hinged portion 110 of the receiving compartment 108 to pivot. The receiving compartment 108, including the hinged portion 110, may be configured to move with respect to ramp 208. The ramp 208 may guide the movement of the receiving compartment 108 as the cover 101 is lowered to a closed position so that the capsule 11 placed within the receiving compartment 108 may slide and rotate into a horizontal position for opening.

Additionally, an arm 153 of the frame 10 connecting hinges 104D and 104F anchors the frame 10 to the base 115 of the dispenser 100 via hinge 104F. Hinges 104B-104F enable a folding mechanism to shift and rotate the capsule 11 and other components attached to the frame 10 as the cover 101 is raised or lowered to open or close the dispenser 100, respectively. In other embodiments, different arrangements of hinges and arms may be used. For example, the arm 153 connecting hinges 104D and 104F could be split into two arms connected via an intermediate hinge to permit the receiving compartment 108 additional range of motion. In other embodiments, the nozzle array 201 may be fixed to the base 115 of the dispenser 100, changing or eliminating a need for the retractable shield 105 or the arm 151 connecting hinges 104B and 104C that is shaped to assist with retraction of the retractable shield 105 as the cover 101 is lowered into a closed position.

Furthermore, in some embodiments, a latch 205 may be connected to a portion of the frame 10 via a latch hinge 206. As the frame 10 folds down into a closed position, the latch 205 may hook onto a latch catch 205A positioned on the lowermost arm 154 connected to hinge 104F. The latch 205 may assist with keeping the movement of frame 10 smooth and unified during operations of the dispenser 100 such as the operation for opening the capsule 11 or the operation for rotating the capsule 11 while the beverage is mixed. The latch 205 is configured to release from the latch catch 205A to permit the frame 10 to unfold back up into an open position when the cover 101 is raised. Other alternatives for keeping the movement of frame 10 smooth and unified during operations of the dispenser 100, including causing frame 10 to engage or disengage with gear train 221 using a solenoid or other mechanism, are also contemplated.

(3) Beverage Mixing:

Yet another aspect of the disclosure is the beverage mixing process. FIGS. 1B-2D illustrate the dispenser and capsule 11 in various configurations during the beverage mixing process as described below.

Figure 1B:
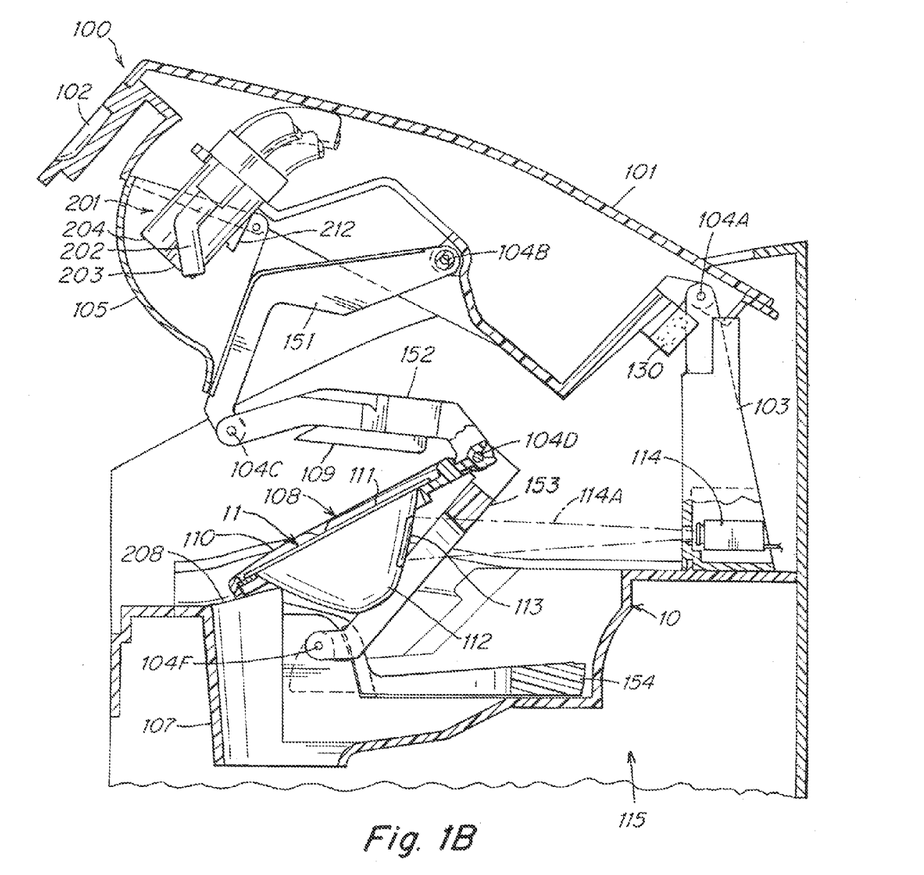

Specifically, FIG. 1B shows the dispenser 100 in an open position. The capsule 11 has been inserted into the receiving compartment 108. The capsule 11 top 111 rests on top of the receiving compartment 108, and the basin 112 extends through the opening of the receiving compartment 112 and further into the space defined by the frame 10 of the dispenser 100. In this position, the scanner 114 or other scanner may be activated to read the encoded information 113 that is printed on the exterior side of the basin 112. When the dispenser 100 is open, the frame 10 is unfolded such that the capsule 11 and receiving compartment 108 are tilted up, positioning the encoded information 113 within the line of sight 114A of the scanner 114. As illustrated in FIG. 1B, the scanner 114 is attached to the dispenser 100 within the rear housing 103, and the scanner 114 may read the encoded information 113 through a hole in the rear housing 103 that faces inward toward the capsule 11 within the space defined by the frame 10.

FIG. 2 shows an exploded isometric view of the open dispenser 100 with the capsule 11 inserted within the receiving compartment 108. FIG. 2 illustrates one embodiment for providing a motor 220 within the base 115 of the dispenser 100. In some embodiments, the motor may be attached to a gear train 221 within a gear train housing 106 and connected to the frame 10 within the base 115 via a set 223 of pins or axles for holding the gears in position or transferring energy from the motor 220 to components within the dispenser 100.

Figure 2A:
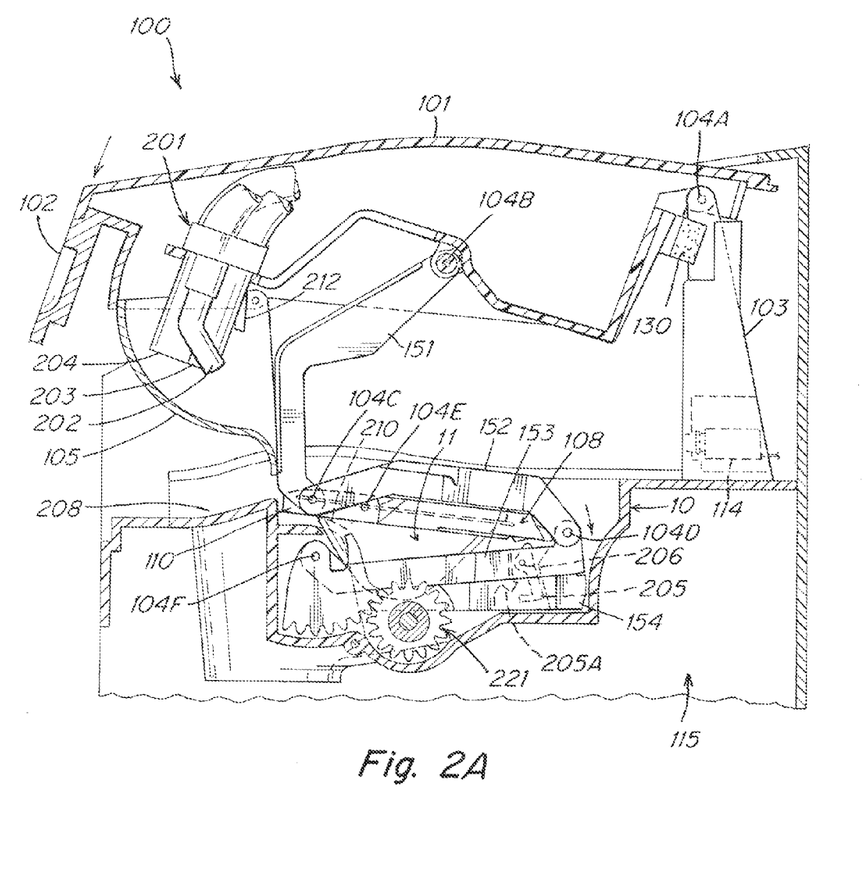
FIGS. 2A-2D illustrate the capsule opening process, capsule rotation process, and beverage mixing in cross sections taken along lines 2A-2A in FIG. 2.

FIG. 2A-2D show cross-section views of the dispenser 100 along section lines 2A-2A of FIG. 2, in which the cross-section views depict the dispenser 100 in a slightly different position for clarity. Specifically, FIG. 2A shows dispenser 100 in a partially closed position as the cover 101 has been partially lowered. As the cover 101 pivots down toward the closed position via hinge 104A, the bumper 130 has swung down engagement with the rear housing 103. Additionally, hinge 104C and hinge 104D have moved into lower positions, causing the receiving compartment 108 and the capsule 11 within the receiving compartment 108 to shift first to an angle about five degrees below a plane parallel to the base, and then as the lid is closed completely, the receiving compartment 108 and capsule 110 rotate about ten degrees, from the angle about five degrees below a plane parallel to the base to a first orientation where the receiving compartment and capsule are approximately five degrees above a plane parallel to the base 115 of the dispenser 100. The rotation of the receiving compartment 108 and capsule 110 from five degrees below the plane parallel to the base to five degrees above the plane parallel to the base during the lid lowering process aids in providing rotational force to help the device open the capsule. In FIG. 2A, latch 205 has moved down toward engagement with the lowermost portion of the frame toward engagement with the latch catch 205A. The retractable shield 105 has not yet retracted to continue protecting the nozzle array 201 while the cover 101 is still partially open.

Figure 2B:
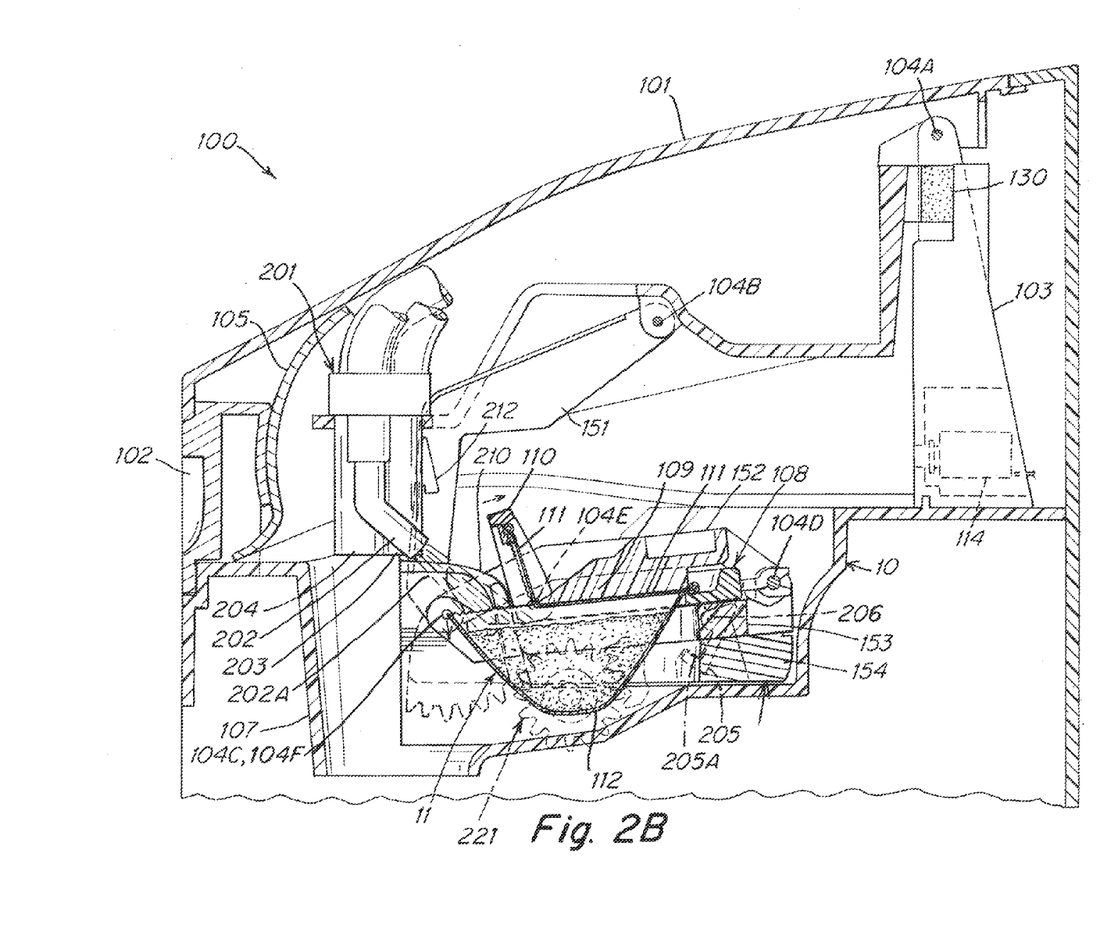

FIG. 2B shows the dispenser 100 in a closed position and operating in an early step of the beverage mixing process. The cover 101 has been fully lowered such that the bumper 130 has fully engaged with the rear housing 103, and the handle 102 has fully engaged with the base 115. The retractable shield 105 is fully retracted up within the cover 101 to make room for the cover 101 to close as the retractable shield 105 is no longer needed to protect the nozzle array 201 or other components while the dispenser 100 is closed. The nozzle array 201 is positioned for mixing.

As described previously, in the position shown in FIG. 2B, the capsule 110 and receiving compartment 108 are about 5 degrees above least a 5 degree angle with respect to the plane parallel to the base, and dispenser 100 has actuated the motor 220 or other mechanism for causing the hinged portion 110 to pivot up and partially open the capsule 11. As shown in FIGS. 2A-2B, when the cover 101 is lowered, hinged portion 110 moves with respect to ramp surface 208, drops onto cam 210, and then pivots about hinge 104E as hinge 104C moves into alignment with hinge 104F. The anvil 109 is engaged with a portion of the receiving compartment 108, and the hinged portion 110 has pivoted up via hinge 104E toward the capsule 11 top 111 to crack and peel back the cover, leaving an opening in an end of the capsule 11. In some embodiments, the hinged portion 110 may include a sharp beak-like appendage on a leading edge of hinged portion 110. The appendage may help stabilize and concentrate the cracking and peeling action as the hinged portion 110 pivots up. Hinge 104C and hinge 104F are coplanar in the cross-section of FIG. 2B when the dispenser 101 is in the closed position to facilitate rotation of the capsule 11 around the coplanar hinges 104C and 104F during mixing.

In an exemplary embodiment, the nozzle array 201 has three nozzles: a mixing nozzle 202, a finishing nozzle 203, and a carbonation nozzle 204. The intake of the mixing nozzle 202 may be connected to a mixing fluid source (not shown). The mixing fluid source may provide filtered water or other liquid that is at an ambient temperature. Alternatively, the mixing fluid may be heated or cooled to an optimal temperature for dissolving any powder mixing agents within the capsule 11. In the closed position, the outtake of the mixing nozzle 202 is positioned for directing mixing fluid into the capsule 11 through the opened end of the capsule 11 via a pre-wetting stream or a mixing stream, as described below.

The intake of the finishing nozzle 203 may be connected to a finishing fluid source (not shown). The finishing fluid source may provide filtered water or other liquid that has been chilled or heated to an optimal temperature for drinking the cold or hot beverage of the user's choice, respectively. The same capsule 11 may be used, regardless of whether the beverage is cold or hot. In the closed position, the outtake of the finishing nozzle 203 is positioned for directing finishing fluid directly into a user's beverage container through the shield 107 via a finishing stream. Furthermore, the arrangement of the outtake of the finishing nozzle 203 and the opened end of the capsule 11 is configured to permit the finishing stream to catch and combine with the mixed contents that will flow out of the opened end of the capsule 11. In some embodiments, the arrangement is further configured to create an aesthetically and acoustically pleasing laminar flow that further facilitates additional mixing action within the beverage container as the combined flow of mixed contents and finishing stream enter the beverage container.

The intake of the carbonation nozzle 204 may be connected to a carbonation source (not shown). The carbonation source may provide sparkling water or other carbonation elements that is at an ambient temperature or that has been chilled or heated to an optimal temperature for creating a carbonated beverage. In the closed position, the outtake of the carbonation nozzle 204 is positioned for directing carbonated fluid directly into a user's beverage container through the shield 107 via a carbonation stream. In some embodiments, the arrangement of the outtake of the carbonation nozzle 203, the outtake of the finishing nozzle 202, and the opened end of the capsule 11 is configured so that the carbonation stream cannot interfere with the catching behavior of the finishing stream that is configured to catch the outflow 202C of mixed contents from the opened end of the capsule 11.

FIG. 2B shows the outtake of the mixing nozzle 202 injecting a pre-wetting stream 202A into the opened end of the capsule 11 as the capsule is in an inclined position. Some capsules may contain a powder mixing agent. The pre-wetting stream mixes with the dry powder in the capsule 11 to create a slurry. In some embodiments, the pre-wetting stream may comprise about 0.5 fluid ounces of liquid. In some embodiments, the pre-wetting stream may be a brief shot of a small quantity of mixing fluid, such as approximately 0.5 fluid ounces of mixing fluid. During the pre-wetting step, the capsule 11 may remain in a horizontal position so that the contents of the capsule 11 may not spill out when the capsule 11 is first opened or when the pre-wetting stream is directed into the capsule 11. At this step, the finishing nozzle 203 and the optional carbonation nozzle 204 may be off such that no finishing stream or carbonation stream is being directed into the beverage container during the pre-wetting step. In some embodiments, the beverage dispenser may pause for a period of time (e.g., approximately two seconds) after stopping the pre-wetting stream before proceeding to the next step so as to permit the pre-wetting mixing fluid to form a slurry with any powder mixing agents in the capsule 11.

Figure 2C:
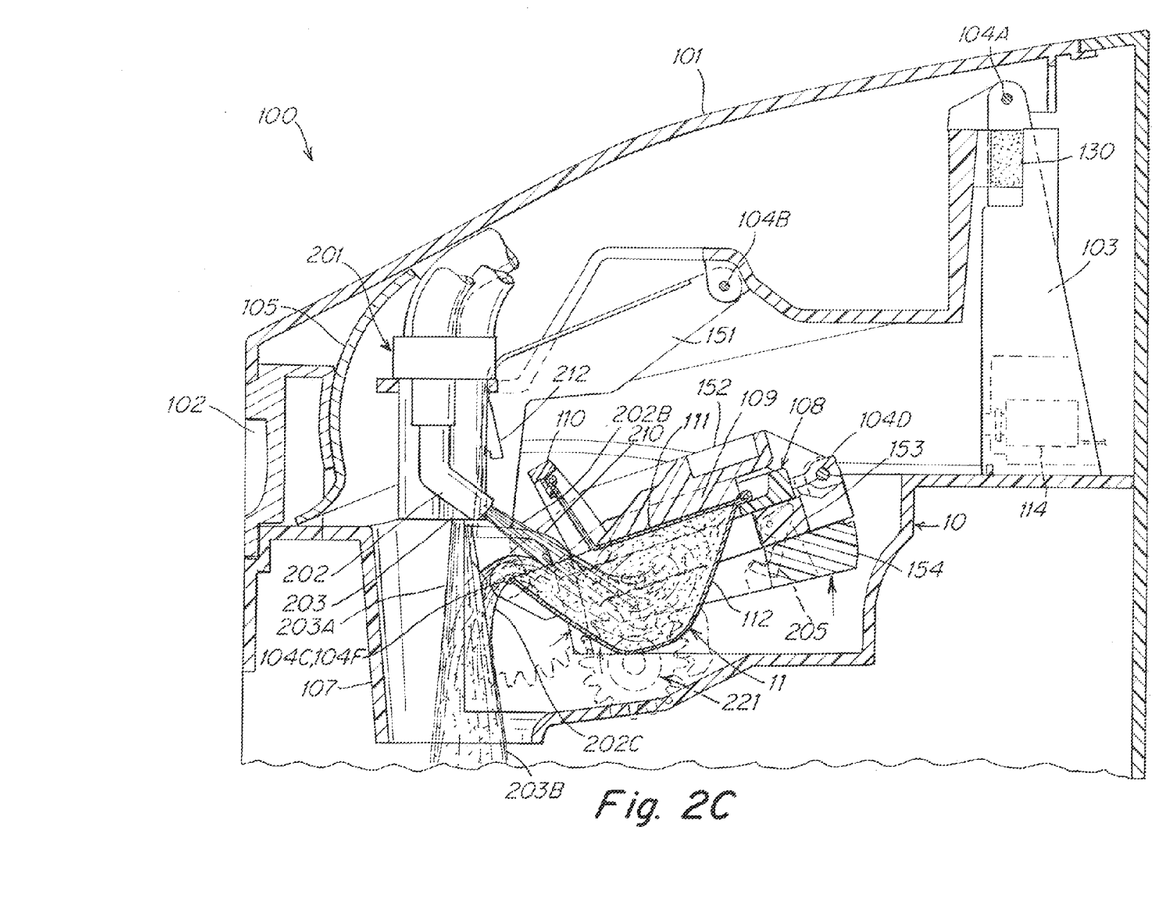

FIG. 2C depicts a later stage of the beverage mixing process during which the capsule 11 has rotated to a more inclined position with respect to a first orientation. During the beverage mixing process, the dispenser 100 causes the capsule 11 to rotate from a first orientation of approximately five degrees above a plane parallel to the base 115 (e.g., approximately five degrees off from a horizontal position) toward a second orientation of approximately 90 degrees above the plane parallel to the base 115 (e.g., approaching a vertical position). As shown in FIG. 2B, the capsule is in a first orientation of approximately five degrees above a plane of parallel to the base in its first orientation. The capsule arrives at the first orientation when the lid is closed In FIG. 2C, the capsule 11 has rotated up slightly from its first orientation toward its second orientation, and the hinged portion 110 has pivoted further to increase the angle of the opening at the opened end of the capsule 11.

As shown in FIG. 2C, the outtake of the mixing nozzle 202 is directing a mixing stream 202B into the capsule 11 through the opening. The mixing stream may create a vortex within the capsule 11 to mix the mixing stream with the slurry and further dissolve the mixing agents. In some embodiments, the mixing stream may comprise about 1.5 fl. oz. of liquid. The mixed contents may begin to flow back out of the opened end of the capsule 11. The mixing stream is directed toward the bottom of the basin 112, within the circumferential and planar rim of the capsule 11. Thus, the mixing nozzle 202 may be configured to leave a space for the mixed contents to flow out over the edge of the rim of the capsule 11 at the opening without interference from the mixing stream.

As shown in FIG. 2C, the outtake of the finishing nozzle 203 is directing a finishing stream 203A down toward the shield 107. In some embodiments, the volume of liquid in the finishing stream may depend on the volume of the beverage, and the finishing stream may provide the remaining liquid for the beverage in addition to the liquid in pre-wetting stream and the mixing stream. For example, the finishing stream may comprise about 14.9 fl. oz. of liquid for a 500 mL beverage. As the mixed contents flow out of the capsule 11, the mixed contents may have some horizontal velocity so that the mixed contents flow 202C toward the finishing stream 203A. The flow of mixed contents may combine with the finishing stream 203A to form a combined flow stream that may be a laminar flow stream 203B, which may be directed down through the shield 107 and into a beverage container (not shown).

Figure 3:
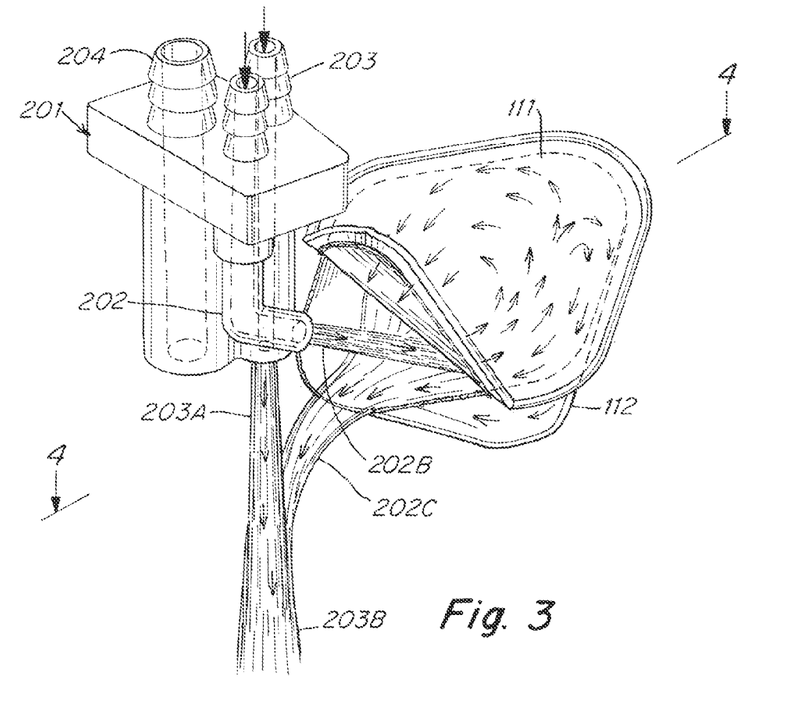
FIGS. 3 and 4 illustrate views of a capsule in accordance with the embodiment depicted in FIG. 1.
Figure 4:
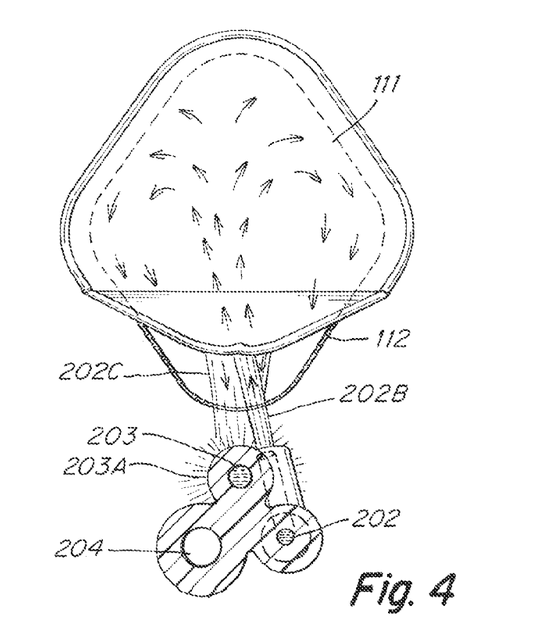

FIG. 2C captures a snapshot in time during the beverage mixing process. While the mixing stream 202B and the finishing stream 203A are on, the capsule 11 may be continuously rotated via the rotating mechanism of the dispenser 100, allowing the contents of the capsule 11 to pour out of the capsule, toward a beverage container. In some embodiments, the capsule 11 begins rotating as soon as the lid is closed. In some embodiments, the mixing nozzle 202 may also move as the capsule is rotating. After the capsule 11 begins rotating, the mixing stream 202B and the finishing stream 203A may be turned on. FIG. 3 depicts an isometric view of the capsule 11 at the point in time shown in FIG. 2C. The mixing nozzle 202 is directing a mixing stream 202A into the capsule 11 and creating a vortex for mixing the content. The device balances the speed of the mixing stream, the speed of rotation and other factors, which allow the contents of the capsule to pour out of the capsule 11 through the opening along an edge below the mixing stream 202A as the capsule 11 is rotated. FIG. 4 shows a top view along section lines 4-4 of FIG. 3, which depicts the finishing stream 203A catching and combining with the outflow 202C of mixed contents from the opening of the capsule 11.

Figure 2D:
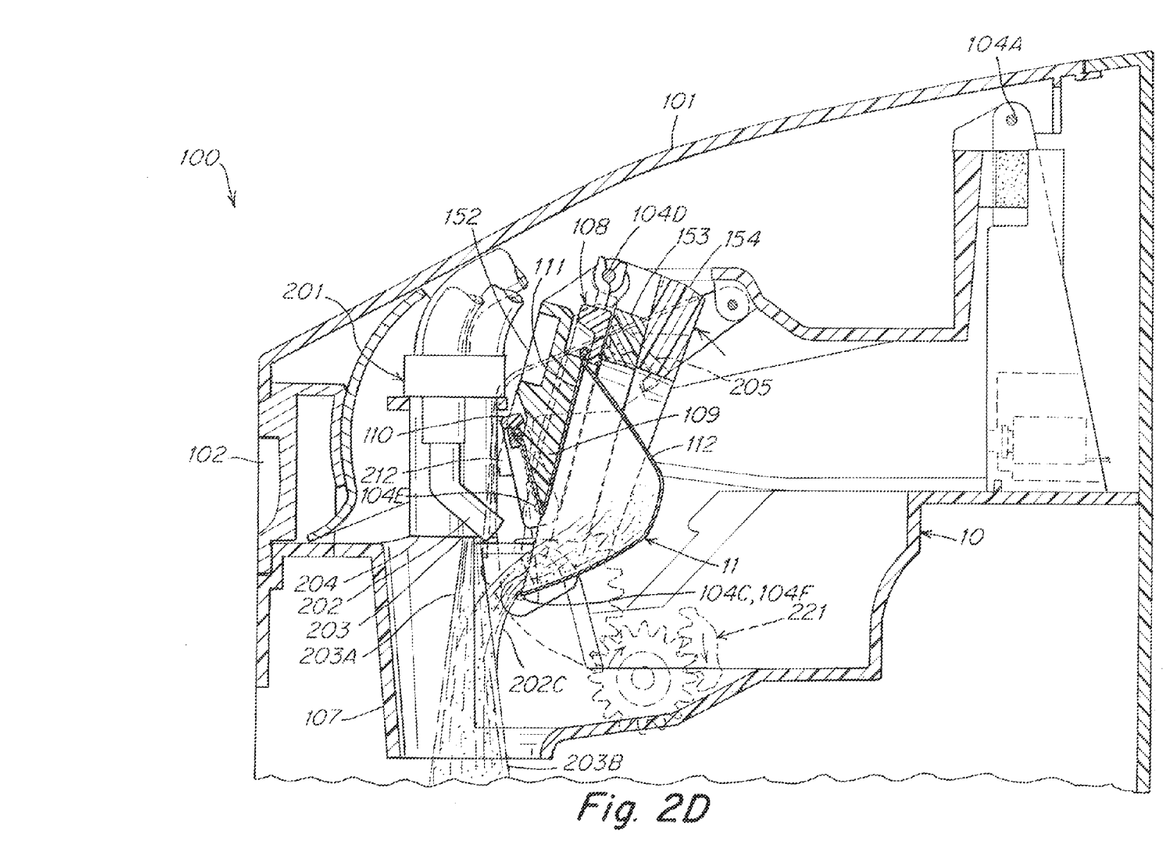

FIG. 2D captures a subsequent snapshot in time during the beverage mixing process when the capsule 11 has been rotated closer to its second orientation (e.g., approximately vertical orientation), and the hinged portion 110 has pivoted further to nearly fully widen the opening of the capsule 11. At this point, the mixing nozzle 202 may have turned off the mixing stream. The total quantity of mixing fluid injected into the capsule 11 via the mixing stream may be approximately 1.5 fluid ounces. The mixing fluid has completely or nearly completely dissolved or otherwise combined with the mixing agents and continues to flow out of the edge of the capsule 11 along the opened end, and the flow of mixed content continues to combine with the finishing stream 203A to form a laminar flow 203B. In the second orientation, the capsule 11 is oriented to drain as much of the mixed content as possible from the capsule 11. In some embodiments, if the user has selected a carbonated beverage, the carbonation nozzle 204 may also be directing a carbonation stream (not shown) down toward the shield 107.

At a snapshot in time (not shown) after the time shown in FIG. 2D, the capsule 11 will stop rotating, the mixed content will have completed flowing out of the opened end of the capsule 11, and the finishing nozzle 203 will have turned off. At this point, the finishing nozzle 203 may have released a quantity of finishing fluid sufficient to create an appropriately mixed serving of beverage (e.g., approximately 6 fluid ounces, or 8 fluid ounces, or more). The cover 101 may be opened again, and the empty or nearly empty capsule 11 may be removed, ejected, or otherwise discarded.

Figure 5:
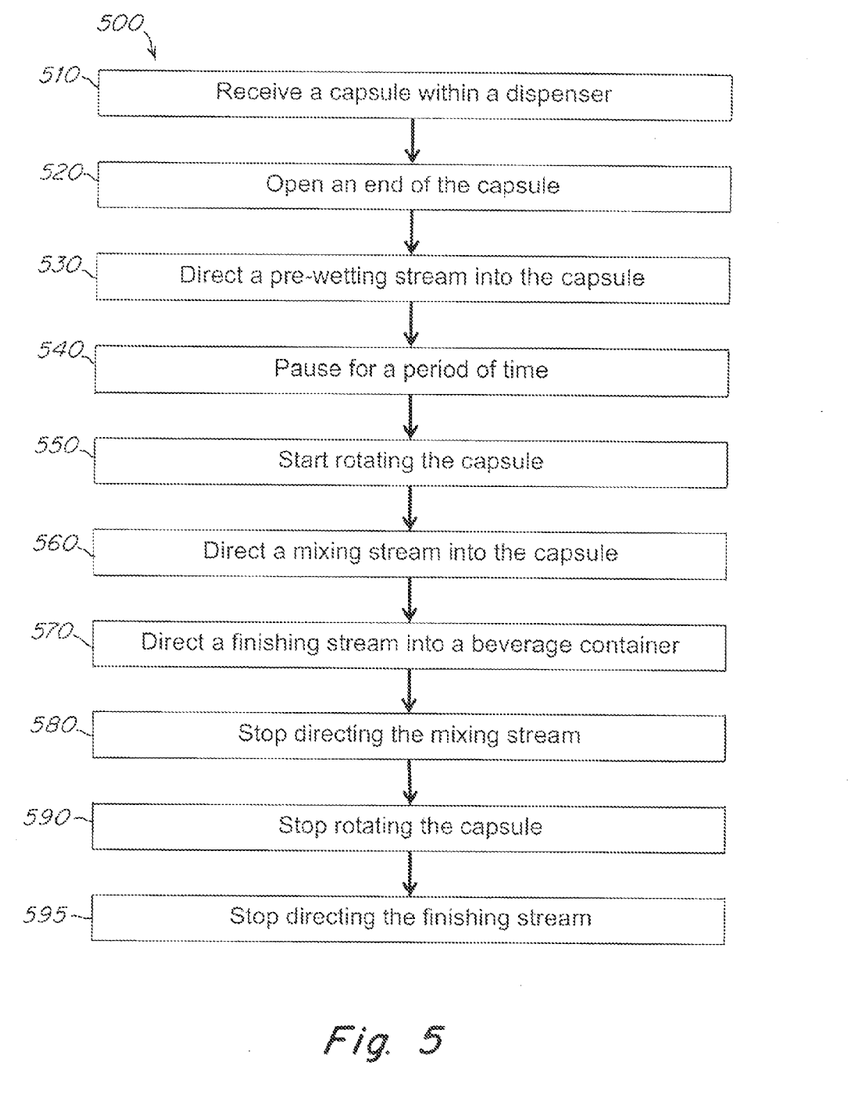
FIG. 5 shows a flow chart illustrating an exemplary process for mixing a beverage according to the present disclosure.

FIG. 5 details a flow chart illustrating an exemplary beverage mixing method 500 for the dispensing of a beverage according to the present disclosure. The beverage mixing method 500 includes a step 510 of receiving a capsule 11 within the dispenser 100. In step 520, the capsule 11 is opened by an opening mechanism of the dispenser 100. In step 530, a pre-wetting stream is directed into the capsule 11 to create a slurry within the capsule 11, which is at an approximately horizontal position. In step 540, the method may optionally pause for a period of time before proceeding to step 550.

In step 550, the capsule 11 may begin rotating under power of a motor or other rotating mechanism of the dispenser 100. In step 560, while the capsule 11 is rotating toward an approximately vertical orientation, a mixing stream may begin being directed into the capsule 11. In step 570, a finishing stream may begin being directed into a beverage container, and a carbonation stream may optionally begin being directed into the beverage container. In embodiments where a carbonation stream is directed into the beverage container, the device may incorporate a carbonation finishing stream dwell time, to allow any rising head of foam to calm down. Additionally, the device may include an additional still liquid finishing stream of higher pressure liquid, to aid additional, further mixing in the beverage container.

In step 580, the mixing stream may be stopped. In step 590, the capsule 11 may reach its nearly vertical orientation and stop rotating as mixed content continues to flow out and combine with the finishing stream to create a laminar flow that proceeds into the beverage container. In step 595, when the capsule 11 is empty or nearly empty, and the mixed content no longer flows out of the opened capsule 11, the finishing stream may be stopped, and the beverage mixing method 500 ends.

While there are many puncture mechanisms that prepare and deliver beverages, the LaVit cracking and peeling mechanism is believed to be a new way to prepare and deliver drinks By exposing the inside of the capsule 11 to a jet of injected mixing stream, the mechanism avoids any build up or clumping of any powder mixing agents on any part of the capsule 11 as the mixture flushes easily out of the capsule 11, allowing a complete and uniform mixing of the substance. When mixing occurs in the capsule 11 and when empty, it is not prone to mildew or bacterial growth like other capsule 11-based systems where the capsule 11 is not flushed.

Commercial applications of the product primarily include the office and home in addition to hospitals, institutions, schools, hotels, cruise boats and any environment where a point-of-use drink machine would be convenient and beneficial.

The invention claimed is:

1. A dispenser for mixing a beverage, comprising:
a frame defining a space to accommodate a capsule within the frame, the capsule having a lid and a capsule body;
a receptacle movably attached to the frame with a protrusion that tears the capsule body under the lid and separates the lid from the capsule body by rotating the capsule against the protrusion creating an opened end; and
a nozzle on the frame aimed into the opened end of the capsule to direct a mixing stream into said opened end when the receptacle is rotating the capsule.

2. The dispenser of claim 1, wherein the receptacle is rotated by an electric motor attached to the frame.

3. The dispenser of claim 1, wherein a retractable member protects the nozzle when the frame is in an open position.

4. The dispenser of claim 1, wherein the opening mechanism of the receptacle further comprises a hinged member, wherein a first portion of the hinged member pivots toward a second portion of the hinged member to open the capsule.

5. The dispenser of claim 1, wherein the first portion of the hinged member pivots toward the second portion of the hinged member during a period of time when a lid of the dispenser is moved from an open position to a closed position.

6. The dispenser of claim 1, further comprising:
a reader on the dispenser adapted to read encoded information on the capsule; and
a processor on the dispenser adapted to enable the dispenser to make the beverage according to a set of instructions based on the encoded information on the capsule.

7. The dispenser of claim 1, wherein the frame is is integrated with a refrigerator.

8. The dispenser of claim 1, wherein the capsule contains a powder or a liquid, and wherein the nozzle directs a pre-wetting stream into the opened end of the capsule prior to directing the mixing stream into said opened end.

9. The dispenser of claim 8, wherein the nozzle pauses for a period of time after directing the pre-wetting stream into the opened end of the capsule prior to directing the mixing stream into said opened end.

10. The dispenser of claim 8, wherein the rotating mechanism rotates the capsule from a first orientation to a second orientation, wherein the first orientation is chosen to prevent the contents from flowing out of the opened end of the capsule.

11. The dispenser of claim 10, wherein the opened end of the capsule is above the capsule's center of gravity in the first orientation, and wherein said opened end is below the center of gravity of the capsule in the second orientation.

12. The dispenser of claim 10, wherein the nozzle directs the pre-wetting stream into the opened end of the capsule while the capsule is in the first orientation.

13. The dispenser of claim 10, wherein the nozzle directs the mixing stream into the opened end of the capsule during at least a part of a period of time while the rotating mechanism rotates the capsule between the first orientation and the second orientation.

14. The dispenser of claim 10, wherein the second orientation enables at least a majority of the contents of the capsule to pour from the opened end of the capsule.

15. The dispenser of claim 14, wherein enabling at least a majority of contents of the capsule to pour from the opened end of the capsule further comprises transferring the contents of the capsule to a container.

16. The dispenser of claim 1, wherein the nozzle also supplies a finishing stream into a beverage container.

17. The dispenser of claim 16, the finishing stream comprises a carbonated stream.

18. The dispenser of claim 16, wherein the nozzle directs the finishing stream into the beverage container during a period of time when contents of the capsule flow out the opened end of the capsule so that the finishing stream contacts the contents flowing out of the capsule to create a combined flow stream into the beverage container.

19. The dispenser of claim 18, wherein the combined flow stream further mixes contents of the capsule within the beverage container.

20. The dispenser of claim 18, wherein the combined flow stream is a laminar flow stream.

21. The dispenser of claim 16, wherein the finishing stream comprises water.

22. The dispenser of claim 21, wherein the mixing stream comprises water that is warmer than the finishing stream.

23. The dispenser of claim 21, wherein the mixing stream comprises water at a temperature chosen for achieving a threshold solubility of contents of the capsule.

24. A dispenser for mixing a beverage, comprising:
a frame defining a space to accommodate a capsule within the frame, the capsule having a lid and capsule body;
a hinged receptacle on the frame with a protrusion that tears the capsule body and separates the lid from the capsule body upon rotating the capsule creating an opened capsule;
at least one nozzle on the frame providing at least one of a pre-wetting stream, a mixing stream, a finishing stream, and a carbonation stream; and
the hinged receptacle adapted to rotate the opened capsule from a first position wherein the opened capsule contains an ingredient to an ending position wherein at least a majority of the ingredient is removed from the opened capsule.

25. The dispenser of claim 24, wherein the hinged receptacle cracks open the capsule along a crease along an end of the capsule.

26. The dispenser of claim 25, wherein the hinged receptacle peels back the end of the capsule along the crease.

27. The dispenser of claim 24, wherein the mixing stream dissolves at least a portion of the ingredient within the capsule.

28. The dispenser of claim 27, wherein the mixing stream flushes at least a portion of the ingredient from the capsule.

29. The dispenser of claim 28, wherein the hinged receptacle rotates the capsule from the first position to the ending position while the mixing stream flushes at least a portion of the beverage ingredient from the capsule to pour the contents of the capsule out of the capsule and into a container.

30. The dispenser of claim 28, wherein the finishing stream is directed to contact at least a portion of the dissolved and flushed ingredient to create a flow into a beverage container.

* * * * *